United States Patent
Vivatson

(10) Patent No.: US 9,341,266 B1
(45) Date of Patent: May 17, 2016

(54) POSITION SENSING HYDRAULIC CYLINDER

(71) Applicant: TEXAS HYDRAULICS, INC., Temple, TX (US)

(72) Inventor: Reed Vivatson, Temple, TX (US)

(73) Assignee: Texas Hydraulics, Inc., Temple, TX (US)

( * ) Notice: Subject to any disclaimer, the term of this patent is extended or adjusted under 35 U.S.C. 154(b) by 381 days.

(21) Appl. No.: 14/012,780

(22) Filed: Aug. 28, 2013

Related U.S. Application Data

(60) Provisional application No. 61/694,043, filed on Aug. 28, 2012.

(51) Int. Cl.
*F16J 10/02* (2006.01)
*F15B 15/28* (2006.01)
*F15B 21/08* (2006.01)

(52) U.S. Cl.
CPC ............. *F16J 10/02* (2013.01); *F15B 15/28* (2013.01); *F15B 15/2815* (2013.01); *F15B 15/2861* (2013.01); *F15B 15/2892* (2013.01); *F15B 21/08* (2013.01)

(58) Field of Classification Search
CPC .. F15B 15/28; F15B 15/2815; F15B 15/2893; F15B 15/2861; F15B 21/08; F16J 10/02
USPC .............. 91/1; 92/5 R; 73/1.79, 1.81, 114.26, 73/114.28
See application file for complete search history.

(56) References Cited

U.S. PATENT DOCUMENTS

| | | | |
|---|---|---|---|
| 1,371,395 A | 3/1921 | Rast | |
| 3,654,549 A * | 4/1972 | Maurer | F15B 15/2861 324/207.16 |
| 4,627,292 A | 12/1986 | Dekrone | |
| 4,755,636 A | 7/1988 | Akio | |
| 5,139,559 A * | 8/1992 | Kozora | C03B 9/1936 65/158 |
| 5,144,275 A * | 9/1992 | Sebastian | F15B 15/28 338/151 |
| 5,318,616 A | 6/1994 | Keller | |
| 6,771,065 B2 * | 8/2004 | Pointer | G01D 5/145 324/207.2 |
| 7,116,100 B1 * | 10/2006 | Mock | G01D 5/04 324/207.2 |
| 7,263,781 B2 | 9/2007 | Sielemann | |
| 7,587,930 B2 | 9/2009 | Leclerc et al. | |
| 7,650,828 B2 | 1/2010 | Rau et al. | |
| 7,956,606 B2 | 6/2011 | Burt et al. | |
| 8,183,855 B2 | 5/2012 | Hornung et al. | |
| 2009/0278641 A1 | 11/2009 | Hedayat | |
| 2011/0120300 A1 | 5/2011 | Fletcher et al. | |

FOREIGN PATENT DOCUMENTS

JP      2008274971 A   *   11/2008

* cited by examiner

*Primary Examiner* — Nathaniel Wiehe
*Assistant Examiner* — Logan Kraft
(74) *Attorney, Agent, or Firm* — David G. Woodral; Fellers, Snider, Blankenship, Bailey & Tippens, P.C.

(57) ABSTRACT

A hydraulic cylinder has an internal shaft that rotates in response to extension or contraction of an output rod. A magnet is affixed to the shaft, the position of which is detected by a sensor internal to the hydraulic cylinder for determining the position of the output rod.

20 Claims, 3 Drawing Sheets

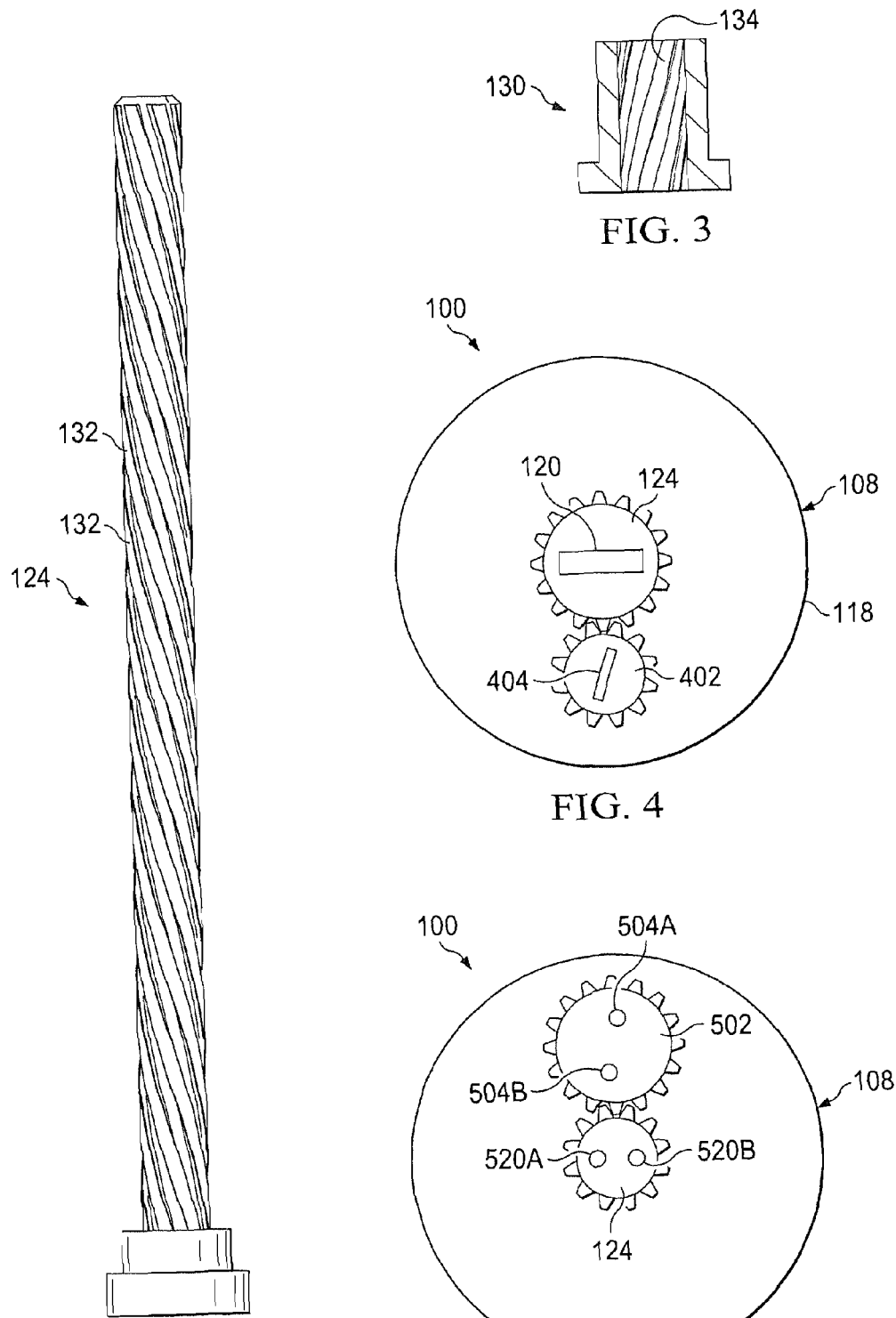

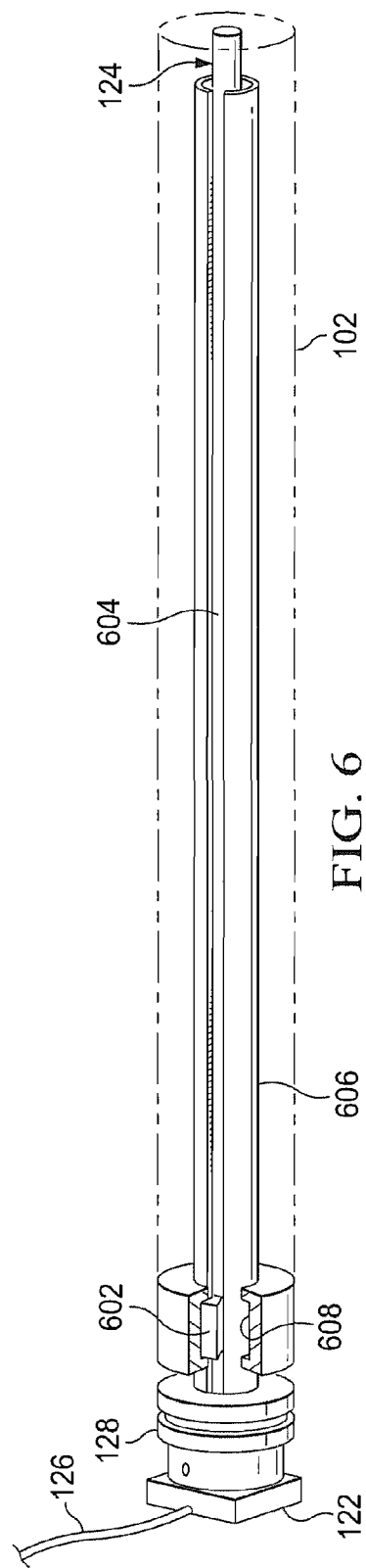

POSITION SENSING HYDRAULIC CYLINDER

CROSS-REFERENCE TO RELATED CASES

This application claims the benefit of U.S. provisional patent application Ser. No. 61/694,043, filed on Aug. 28, 2012, and incorporates such provisional application by reference into this disclosure as if fully set out at this point.

FIELD OF THE INVENTION

This disclosure relates to the field of hydraulics in general and, more particularly, to hydraulic cylinders with integrated position sensing systems.

BACKGROUND OF THE INVENTION

Hydraulic systems and devices are ubiquitous in the industrialized world. Large forces can be brought to bear when needed for lifting, cutting, and the like using hydraulic cylinders, which are themselves lightweight relative to the amount of force they can provide. Oftentimes, the full extension or power available from a hydraulic cylinder is not needed. Precision applications may require that a cylinder provide a certain amount of extension or contraction and no more. External sensors and measuring devices can be used but these can be inconvenient, particularly in mobile applications or where a hydraulically actuated arm or other device has several degrees of freedom.

What is needed is a system for addressing the above and related concerns.

SUMMARY OF THE INVENTION

The invention of the present disclosure, in one aspect thereof, comprises a hydraulic cylinder having a barrel with an end cap on a first end thereof, a rod that extends from a second end of the barrel in response to hydraulic pressure applied to an attached piston within the barrel, a helical shaft having a magnet on a first end thereof and extending into the rod on a second end thereof, and a bushing in a fixed relationship with respect to the rod. The first end of the helical shaft is affixed to the end cap with the magnet within sensing proximity of a magnetic sensor that senses the rotational position of the helical shaft relative to the end cap. The bushing mates with the helical shaft in a sliding relationship such that the helical shaft is rotated in response to extension or contraction of the rod from the cylinder barrel.

In some embodiments, the cylinder has a gear with an affixed magnet that rotates with the helical shaft providing redundant rotational information. The cylinder may have a housing in a fixed relationship with respect to the end cap and in proximity to the magnetic sensor, the housing containing the magnet and a portion of the helical shaft within. A guide may be affixed to the end cap and extend into the barrel. The guide provides a longitudinal channel within the barrel that retains a tang affixed to the bushing to allow extension and contraction of the tang with the rod but not rotation of the tang about the helical shaft. A circumferential groove defined at least partially by the output rod, the groove retaining the tang to impart extension and contraction forces to the tang but substantially no rotational forces.

The invention of the present disclosure, in another aspect thereof, comprises a hydraulic cylinder with first and second working ends with an output rod therebetween having a fixed position relative to the second working end. The hydraulic cylinder has a bushing mated to the output rod such that the bushing extends and contract with the second working end, an internal shaft affixed to the first working end such that the internal shaft extends and contracts with the first working end, and a sensor that detects rotation of the internal shaft. The bushing has an internal contour that is complementary to an outer contour of the internal shaft such that the internal shaft rotates a predetermined amount relative to a predetermined amount of extension or contraction of the first and second working ends.

In some embodiments, the hydraulic cylinder has at least one magnet affixed to the internal shaft, the position of which is read by the sensor. Some embodiments have at least one gear having an affixed magnet that rotates in response to rotation of the internal shaft providing redundant information regarding the rotation.

The hydraulic cylinder may have an end cap at the first working end thereof, the end cap containing a housing that retains the internal shaft and the magnet. The cylinder may have a barrel for receiving hydraulic fluid and affixed at a first end to the end cap. A piston may be internal to the barrel and affixed to the output rod. The piston provides motive force to the output rod in response to hydraulic pressure in the barrel. The bushing may be affixed between the piston and the output rod and a gland may be affixed to a second end of the barrel. The gland may pass a portion of the output rod therethrough, but retain the piston within the barrel.

Some embodiments of the hydraulic cylinder have a guide defining a longitudinal channel and being in a fixed relationship with respect to the first working end, the longitudinal channel retaining a tang proceeding from the bushing and preventing rotation thereof. The output rod may at least partially define an internal groove that receives the tang such that the tang extends and contracts from the first working end with the second working end and stays within the longitudinal channel. The groove may also be partially defined by the hydraulic piston.

The invention of the present disclosure, in another aspect thereof, comprises a hydraulic cylinder comprising having a barrel having and end cap on a first end thereof and having a gland on a second end thereof. The cylinder has an output rod in a sliding engagement with the gland and having a working end and an opposite end attached to a hydraulic piston within the barrel, and a housing retained by the end cap. The housing contains a first end of a rotatable internal shaft, the shaft providing at least one magnet affixed thereto. A sensor is retained by the end cap for sensing the position of the magnet. A guide is affixed to the housing and provides a longitudinal channel within the output rod. A transverse circumferential groove is defined with respect to the output rod that imparts extension and contraction of the output rod to a tang affixed to a bushing, the tang travelling within the longitudinal channel and being restrained from rotational movement within the transverse circumferential groove. An internal contour of the tang cooperates with an external contour of the internal shaft such that extension or contraction of the bushing relative to the end cap imparts a predetermined rotation to the internal shaft that may be read magnetically by the sensor.

In some embodiments, the internal shaft is externally helically splined and the bushing is internally helically grooved. The cylinder may contain a gear with a magnet inside the end cap that rotates with the internal shaft providing redundant information regarding the extension or contraction of the rod. Additionally, the circumferential groove may be at least partially defined by a juncture between the output rod and the hydraulic piston.

BRIEF DESCRIPTION OF THE DRAWINGS

FIG. 2 is a side view of a splined shaft for use with the hydraulic cylinder of FIG. 1.

FIG. 3 is a side cutaway view of a splined bushing corresponding to the shaft of FIG. 2.

FIG. 4 is an end view of a redundant sensor output system for use with a hydraulic cylinder according to aspects of the present disclosure.

FIG. 5 is an end view of another redundant sensor output system for use with a hydraulic cylinder according to aspects of the present disclosure.

FIG. 6 is a cutaway view of a rotation independent sensor system for use with a hydraulic cylinder according to aspects of the present disclosure.

DETAILED DESCRIPTION OF THE PREFERRED EMBODIMENTS

Figure 1:
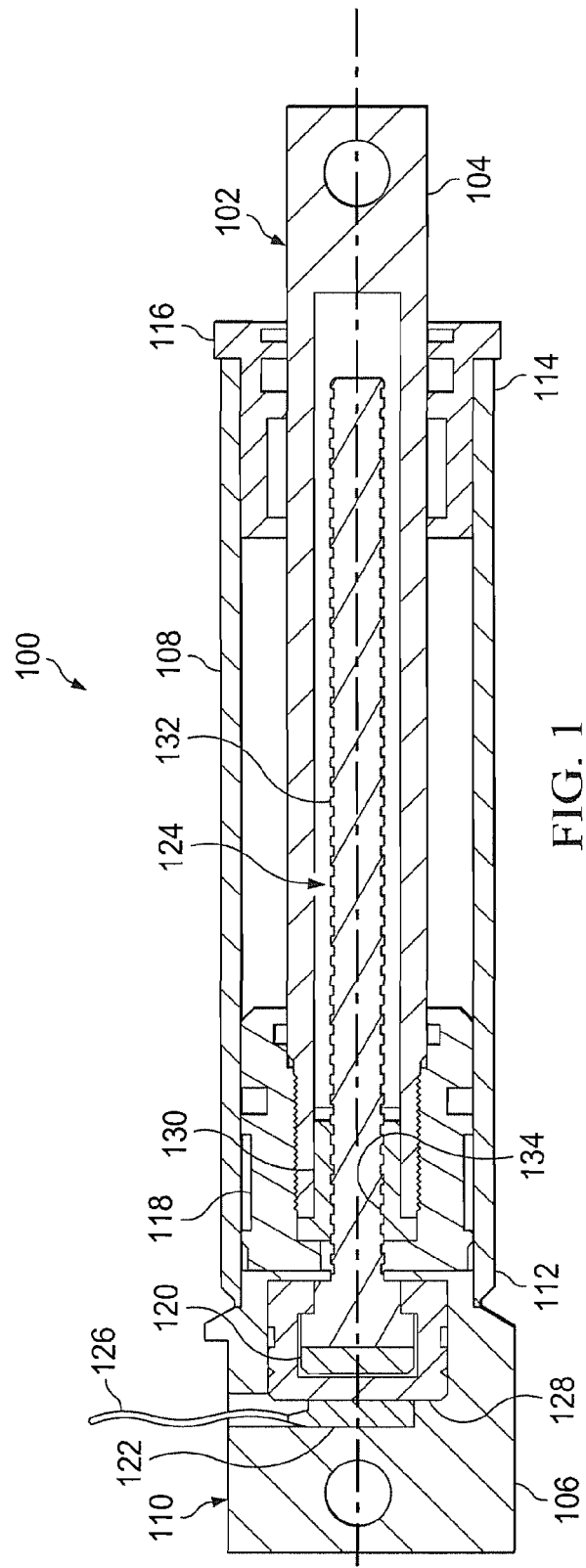
FIG. 1 is a side cutaway view of a hydraulic cylinder with an integral position sensor according to the present disclosure.

Referring now to FIG. 1, a side cutaway view of a hydraulic cylinder 100 with an integral position sensor 122 according to the present disclosure is shown. As explained herein, the hydraulic cylinder 100 of FIG. 1 is capable of providing an electrical signal correspondent to the position, direction of movement, and/or velocity of an output rod 102. The length between the working ends 104, 106 of the cylinder 100 and how fast they are moving apart or contracting may also be determined. Such information may be useful in a wide variety of machinery or hydraulic powered apparatus to inform the user of the current working state of the cylinder 100. In some cases this information may be fed into a control computer and/or used in a feedback loop to fine tune the intended operation of the cylinder 100.

In various embodiments, the cylinder 100 of the present disclosure comprises a cylinder barrel 108 having a cylinder end cap 110 on a first end 112. The opposite, second end 114 of the barrel 108 is capped with a gland 116 through which the output rod 102 proceeds. During operation, one or the other of the working ends 104, 106 of the cylinder 100 will be anchored (e.g., to the frame of a piece of machinery) and the other will drive or displace the load. Hydraulic pressure (or vacuum) may be introduced into the barrel 108 and bear upon the piston 118 attached to the rod 102 to effectuate movement of the rod 102. However, it is understood that the systems of the present disclosure may also operate under pneumatic pressure (or vacuum).

In order to detect the current position (e.g., extension) between the end cap 110 and rod 102, a magnet 120 is provided that has a rotational position that is sensed by a high sensitivity magnetic sensor 122. The sensor 122 may be located within the cylinder end cap 110. In various embodiments the sensor 122 may be an angle or rotation sensor detecting the position of an elongated magnet, or a magnet having another shape that works well with the sensor 122. In some embodiments, multiple magnets will be utilized. They may be affixed to a shaft 124 in different orientations to allow the sensor 122 to differentiate between which magnet is being detected (e.g., one magnet may be installed with the north pole toward the sensor 122 and the other with the south pole toward the sensor 122).

In operation, it may be convenient to affix the end cap 110 to the portion of the machinery that moves the least such that sensor leads 126 may be easily fed into an indicator or computer that displays the sensed information. Furthermore, this may aid in preventing the leads 126 from becoming damaged. In other embodiments, the sensor 122 may transmit its information wirelessly.

A non-magnetic or non-ferrous housing 128 may be contained within the end cap 110 adjacent to the magnetic sensor 122. This housing 128 contains the aforementioned magnet 120 whose rotational position is sensed. In the present embodiment, the magnet 120 is affixed to a first end of an internal shaft 124. As shown, the length of the shaft 124 may approximately match the length of the rod 102 such that the position of the rod 102 can be sensed along its entire operational length.

In order to correlate the rotational position of the magnet 120 to the length of extension of the rod 102, the shaft 124 may be helically splined and mated to a corresponding helically splined bushing 130 contained within the piston 118 and/or output rod 102. The shaft 124 and the bushing 130 need not necessarily be helically splined per se. Rather, in the present disclosure, the term "spline", "splined", and/or "helical" are taken to mean that the shaft 124 has an outer surface or contour 132 that is mated to an inner surface or contour 134 of the bushing 130 so as to allow sliding movement between the bushing 130 and the shaft 124 to be translated into rotational movement. For example, flats that curve around the shaft 124 and extend along all or part of its length may be machined into the otherwise cylindrical shaft 124 to impart rotation when it slides though a cooperating bushing 130.

During normal operation, the end cap 110 and the output rod 102 do not experience rotation with regard to one another, but only extension and contraction. The piston 118 is also normally affixed to the rod 102 in a non-rotational manner during operation. Thus, the end cap 110, the piston 118, and the output rod 102 experience no rotation relative to one another. This arrangement allows the helical bushing 130, which is affixed to the piston 118, to impart a rotation to the helical shaft 124 as it is drawn through the piston 118 during extension of the rod 102. A reverse rotation will be experienced by the shaft 124 when the rod 102 contracts into the cylinder barrel 108. Therefore the magnet 120 attached to the shaft 124 will provide a rotational indication of the position of the output rod 102. The position may be sensed by the sensor 122 and provided as an electrical signal to an indicator or computer.

Where only the single sensor 122 shown in FIG. 1 is to be utilized to indicate the position of the rod 102, the helical splines of the shaft 124 and bushing 130 may be configured such that the shaft 124 experiences a single rotation from the fully extended position to the fully contract position. It may be necessary to configure the splines or surfaces 132, 134 such that the shaft 124 makes somewhat less than a full rotation over the full extension in order to ensure that the sensor 122 does not have an overlap in readings of the rotational position of the magnet 120. FIG. 2 illustrates a side view of a splined shaft 124 configured to allow approximately one rotation over its length. FIG. 3 is a side cutaway of a corresponding bushing 130. It should be noted that the figures are not necessarily to scale. The diameters of the shaft 124 and bushing 130 may be increased to allow for a reading over a longer stroke or extension of the rod 102.

In cases where the maximum workable diameter of the shaft 124 and/or bushing 130 is reached before the maximum extension of the rod 102 can be read, the shaft 124 and/or bushing 130 may be configured such that multiple rotations of the shaft 124 occur over the full extension length of the rod 102. The number of overall rotations of the magnet 120 (and hence the shaft 124) may be tracked electronically. This combined with the information from the sensor 122 concerning the current rotational position of the magnet 120 may be used to determine with accuracy the current position of the rod 102, even where the shaft 124 makes more than one rotation over the maximum extension length of the rod 102. In other embodiments, even where it is possible to match approximately one rotation of the shaft 124 to a complete extension of the rod 102, the shaft 124 and bushing 130 may be configured for multiple rotations in order to increase accuracy of the reading of the sensor 122.

In some embodiments, the shaft 124 may be geared (or affixed to a gear) inside the end cap 110. A larger gear may be affixed to the magnet 120 such that the motion of the magnet 120 is reduced relative to the shaft 124. This allows a single rotation of the magnet 120 to represent multiple rotations of the shaft 124 (and hence, a length of extension longer than could otherwise be followed with a single turn of the magnet 120). It will also be appreciated that the gearing between the shaft 124 and the magnet 120 could operate to rotate the magnet 120 faster than the shaft 124. This type of gearing may be useful in embodiments where the number of turns of the magnet 120 is tracked to further increase accuracy.

The systems described herein may also be configured for redundant output. In cases where gearing is used between the shaft 124 and the magnet 120, more than one output gear may be utilized. For example, the shaft gear may turn two or more gears inside the end cap 110, each attached to one or more magnets. One or more sensors may be utilized to read the position of the magnet(s) located on or attached to each of the gears. Thus, redundant outputs may be generated (either from multiple sensors or from a single sensor capable of taking multiple readings). The gearing on each of the magnets need not necessarily be the same (e.g., one may provide coarse position information and the other a fine position signal).

FIG. 4 is an end view of a redundant sensor output system for use with a hydraulic cylinder according to aspects of the present disclosure is shown. The end view of FIG. 4 is substantially what the sensor 122 would be able to record as viewed from the working end 106 to the working end 104. Here, the shaft 124 provides the magnet 120, which may be read by the sensor 122 (or sensors if multiple ones are used) to determine extension of the rod 102 as previously described. The shaft 124 is configured as a gear that turns a smaller gear 402. Hence the gear 402 provides additional resolution over the shaft 124. The gear 402 is also provided with a magnet 404, that may be read by sensor 122 or another. As described, these two magnets, rotating at different rates as the rod 102 extends, provide additional redundant or detailed information about the state of extension. Although only a single additional gear 402 and magnet 404 are shown, it is appreciated that multiple additional gears could be provided (as steps up or down) from the same shaft 124. Multiple sensors may be provided as needed to adequately read the associated magnets.

Referring now to FIG. 5, an end view of another redundant sensor output system for use with a hydraulic cylinder according to aspects of the present disclosure is shown. Here the shaft 124 is smaller relative to an auxiliary gear 502. Thus the shaft 125 may turn slower, and provide less resolution, than the larger gear 502. In the present embodiment, the shaft 124 provides two separate magnets 520A and 520B. These may be affixed to the shaft such that one provides a north pole to the sensor 122 and the other a south pole. The larger gear 502 also provides a set of magnets 504A and 504B which may also be affixed with alternating poles. A single sensor 122 or multiple sensors may be placed in proximity to the gear 502 and shaft 124 as they rotate due to extension or contraction of the rod 102 as previously described.

In some cases, a hydraulic cylinder 100 (as described above) may be installed into a machine or application in which a degree of rotational freedom is required between the working ends 104, 106, or between the end cap 110 and the output rod 102. In such case, the rotation between the ends 104, 106 that is due to articulation in the machine can rotate the shaft 124 enough to cause a false reading by the sensor 122 indicate extension or contraction (or a greater or lesser degree of either) when there is none. In such case, the internal workings of the cylinder 100 may be modified as described below, to eliminate this effect.

Referring now to FIG. 6, a cutaway view of a rotation independent sensor system 600 for use with a hydraulic cylinder 100 according to aspects of the present disclosure is shown. This modified system 600 is referred to as rotation independent in that it substantially eliminates any aberration in the readings of extension in those purposes for which rotation may be allowed or required between the ends 104, 106 the cylinder 100. In other words, it reports only the degree of extension between the rod ends 104, 106 regardless of how the ends 104, 106 (or rod 102 and end cap 110) are otherwise rotated.

For purposes of clarity, the system 600 is shown partially removed from the associated hydraulic cylinder (e.g., hydraulic cylinder 100). Any parts not shown or explained in this viewpoint may be taken to be substantially similar to those previously described. The bushing 130 is not entirely visible in FIG. 6 but interacts with the shaft 124 in a similar manner (e.g., by mated splines or other surfaces). However, the bushing 130, instead of being fixed rigidly to the rod 102 (and/or piston 118) is engaged only with the rod 102, and only via a tang 602. The tang 602 is allowed to travel within a transverse circumferential groove 608 defined in the rod 102. Extension or contraction of the rod 102 thus displaces the tang 602 by substantially the same degree as the rod 102. The displacement of the rod 102 will effect a rotation of the shaft 124 through its interaction with the bushing 130 as previously described. In some embodiments, the groove 608 may be defined at least partially by the piston 118 or at a juncture between the piston 118 and the rod 102.

A longitudinal channel 604 is defined in a guide 606 that extends from a fixed location relative to the end cap 110. In the present embodiment, the guide 606 extends from housing 128. The channel 604 allows the tang 602 to displace longitudinally with the groove 608 but does not allow it to displace in response to mere rotation of the shaft 102 and groove 608. Thus the only displacement of the tang 602 is in response to extension or contraction of the shaft 102, but not in response to mere rotation of the shaft 102.

It will be appreciated that the sensing system described herein will have little to no impact on the load bearing or operational capability of the cylinder 100. The sensor 122 is a non-contact device and does not have to touch any moving part to operate. Furthermore, the sensor 122 may be constructed in a relatively small size for deployment within small hydraulic cylinders. Due to the construction of the cylinder 100, the magnetic sensor 122 is isolated from high pressure hydraulic fluids, yet still able to precisely telegraph the position of the rod 102. In the event a sensor 122 does need servicing or replacement, it is possible to remove and replace the sensor 122 without disassembling the hydraulic cylinder 100 or removing it from the machine in which it is operating.

It is understood that the hydraulic cylinder described herein, in various sizes and capacities, may be suitable for a wide variety of application. The present disclosure is not meant to be limited by the application or environment. Furthermore, the present disclosure is not meant to be limited by the particularly hydraulic circuit configuration into which the various hydraulic cylinders of the present disclosure may be deployed. One of skill in the art will appreciate the wide variety of hydraulic circuits that can be implemented. Further, for clarity, seals, hoses, fluid reservoirs, pumps, and the like that are known to one of skill in the art are not illustrated in the present disclosure.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the invention as defined by the claims.

What is claimed is:

1. A hydraulic cylinder comprising:
   a barrel with an end cap on a first end thereof defining a first working end of the hydraulic cylinder;
   a rod that extends from a second end of the barrel in response to hydraulic pressure applied to an attached piston within the barrel, the output rod defining a second working end of the hydraulic cylinder;
   a helical shaft having a magnet on a first end thereof and extending into the rod on a second end thereof; and
   a bushing in a fixed relationship with respect to the rod;
   a magnetic sensor for sensing the linear position of the piston, contained inside the end cap of the hydraulic cylinder and mechanically isolated from the rod and the hydraulic pressure applied to the piston;
   wherein the first end of the helical shaft is affixed to the end cap with the magnet within sensing proximity of the magnetic sensor, which senses the rotational position of the helical shaft relative to the end cap; and
   wherein the bushing mates with the helical shaft in a sliding relationship such that the helical shaft is rotated in response to extension or contraction of the rod from the barrel.

2. The hydraulic cylinder of claim 1, further comprising a gear with an affixed magnet that rotates with the helical shaft providing redundant rotational information.

3. The hydraulic cylinder of claim 1, further comprising a non-ferrous housing in a fixed relationship with respect to the end cap and in proximity to the magnetic sensor, the housing containing the magnet and a portion of the helical shaft within.

4. The hydraulic cylinder of claim 1, further comprising a guide affixed to the end cap and extending into the barrel, the guide providing a longitudinal channel within the barrel that retains a tang affixed to the bushing to allow extension and contraction of the tang with the rod but not rotation of the tang about the helical shaft.

5. The hydraulic cylinder of claim 4, further comprising a circumferential groove defined at least partially by the output rod, the groove retaining the tang to impart extension and contraction forces to the tang but substantially no rotational forces.

6. A hydraulic cylinder comprising:
   first and second working ends anchored to a machine frame and a load, respectively, with an output rod therebetween having a fixed position relative to the second working end;
   a bushing mated to the output rod such that the bushing extends and contracts with the second working end;
   an internal shaft affixed to the first working end such that the internal shaft extends and contracts with the first working end; and
   a sensor situated inside an end cap that defines the first working end, the sensor detecting a degree of rotation of the internal shaft in order to determine the linear position of the piston without a mechanical linkage to the internal shaft;
   wherein the bushing has an internal contour that is complementary to an outer contour of the internal shaft such that the internal shaft rotates a predetermined amount relative to a predetermined amount of extension or contraction of the first and second working ends.

7. The hydraulic cylinder of claim 6, further comprising at least one magnet affixed to the internal shaft, the position of which is read by the sensor.

8. The hydraulic cylinder of claim 7, further comprising at least one gear having an affixed magnet that rotates in response to rotation of the internal shaft providing redundant information regarding the rotation.

9. The hydraulic cylinder of claim 7, further comprising a non-ferrous housing inside the end cap that retains the internal shaft and the magnet.

10. The hydraulic cylinder of claim 9, further comprising a barrel for receiving hydraulic fluid and affixed at a first end to the end cap.

11. The hydraulic cylinder of claim 10, further comprising a piston internal to the barrel and affixed to the output rod, the piston providing motive force to the output rod in response to hydraulic pressure in the barrel.

12. The hydraulic cylinder of claim 11, wherein the bushing is affixed between the piston and the output rod.

13. The hydraulic cylinder of claim 12, further comprising a gland affixed to a second end of the barrel, the gland passing a portion of the output rod therethrough but retaining the piston within the barrel.

14. The hydraulic cylinder of claim 13, further comprising a guide defining a longitudinal channel and being in a fixed relationship with respect to the first working end, the longitudinal channel retaining a tang proceeding from the bushing and preventing rotation thereof.

15. The hydraulic cylinder of claim 14, wherein the output rod at least partially defines an internal groove that receives the tang such that the tang extends and contracts from the first working end with the second working end and stays within the longitudinal channel.

16. The hydraulic cylinder of claim 15, wherein the groove is partially defined by the hydraulic piston.

17. A hydraulic cylinder comprising:
   a barrel having an end cap on a first end thereof and having a gland on a second end thereof;
   an output rod in a sliding engagement with the gland and having a working end and an opposite end attached to a hydraulic piston within the barrel;
   a housing retained by the end cap, the housing containing a first end of a rotatable internal shaft, the shaft providing at least one magnet affixed thereto;
   a sensor retained by the end cap for sensing the position of the magnet; and
   a guide affixed to the housing and providing a longitudinal channel within the output rod;
   wherein a transverse circumferential groove is defined with respect to the output rod that imparts extension and contraction of the output rod to a tang affixed to a bushing, the tang travelling within the longitudinal channel and being restrained from rotational movement within the transverse circumferential groove; and
   wherein an internal contour of the tang cooperates with an external contour of the internal shaft such that extension or contraction of the bushing relative to the end cap imparts a predetermined rotation to the internal shaft that may be read magnetically by the sensor.

18. The cylinder of claim 17, wherein the internal shaft is externally helically splined and the bushing is internally helically grooved.

19. The cylinder of claim 17, further comprising a gear with a magnet inside the end cap that rotates with the internal shaft providing redundant information regarding the extension or contraction of the rod.

20. The cylinder of claim 17, wherein the circumferential groove is at least partially defined by a juncture between the output rod and the hydraulic piston.

* * * * *